(12) United States Patent
Handke

(10) Patent No.: US 6,269,920 B1
(45) Date of Patent: Aug. 7, 2001

(54) TENSION STOP LIMIT HOLDER FOR A VIBRATION DAMPER

(75) Inventor: Günther Handke, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/359,549

(22) Filed: Jul. 22, 1999

(30) Foreign Application Priority Data

Jul. 23, 1998 (DE) .............................................. 198 33 008

(51) Int. Cl.⁷ ...................................................... F16F 9/00
(52) U.S. Cl. ................... 188/321.11; 188/322.19; 267/220; 280/124.145
(58) Field of Search ................ 267/66, 220; 188/321.11, 188/322.19; 280/96.1, 668, 124.143, 124.145, 124.146, 124.154; 248/230.1, 916

(56) References Cited

U.S. PATENT DOCUMENTS

| | | | |
|---|---|---|---|
| 4,944,524 | * 7/1990 | Achenbach | 267/221 |
| 5,401,051 | * 3/1995 | Ivory | 280/668 |
| 5,622,242 | * 4/1997 | Handke et al. | 188/322.19 |
| 5,893,435 | * 4/1999 | Handke et al. | 188/321.11 |

FOREIGN PATENT DOCUMENTS

| | | | |
|---|---|---|---|
| 43 21 036 | 1/1995 | (DE) | B60G/13/00 |
| 195 47 591 | 8/1996 | (DE) | B60G/13/00 |
| 91/06438 | 5/1991 | (WO) | B60G/15/07 |

* cited by examiner

Primary Examiner—Robert J. Oberleitner
Assistant Examiner—Mariano Sy
(74) Attorney, Agent, or Firm—Cohen, Pontani, Lieberman & Pavane

(57) ABSTRACT

A tension stop limit holder for a vibration damper in a vehicle suspension, comprises a U-shaped base section with a base plate and two opposing side walls. The base plate has a cutout which is adapted to the outer contour of a container tube of the vibration damper so that the tension stop limit holder contacts the container tube and the side walls can be welded with the container tube. At least one of the side walls has a receptacle for a connection with a stabilizer link of the vehicle length.

6 Claims, 6 Drawing Sheets

TENSION STOP LIMIT HOLDER FOR A VIBRATION DAMPER

BACKGROUND OF THE INVENTION

1. Field of the Invention

The present invention is directed to a tension stop limit holder for limiting the extension of a vibration damper of a vehicle suspension.

2. Description of the Related Art

A prior art vibration damper, more specifically a spring strut for a motor vehicle suspension, is disclosed in German reference DE 195 47 591 A1 with an essentially U-shaped tension stop limit holder which is fastened to a container tube of the vibration damper and which contacts a supporting surface on the body side of the vibration damper during a rebound or deflection of a vehicle axle. The prior art tension stop limit holder comprises a base plate with side walls and the entire tension stop limit holder is formed of an individual bent part. The base plate, in its blank state, has an elongation relative to the side walls which is shaped, as a finished part, in such a way that the elongation extends between the side walls proceeding from the base plate as a back plate. Reference is also had in this connection to German reference DE 43 21 036 A1 and PCT reference WO 91/06438 which show prior art variations of this device.

The construction of the prior art tension stop limit holder according to DE 195 47 591 has a cutout which is adapted to the outer contour of the container tube of the vibration damper. A stop plate is additionally provided proceeding from the base plate which contacts the container tube in the installed position of the tension stop limit holder. A number of difficulties arise with respect to assembly of this prior art device. For one, the prior art tension stop limit holder must be clamped to the container tube for the process of welding to the container tube. The tension stop limit holder will not maintain its intended position by its own weight. Further, only a weld with a weld thickness a determined by the sheet metal thickness of the tension stop limit holder can be used.

Vehicle axles are very often outfitted with a stabilizer. Another problem in the prior art references is that a stabilizer link must be provided which is fastened to the vibration damper for this stabilizer.

SUMMARY OF THE INVENTION

It is the object of the present invention to provide a tension stop limit holder which solves the problem aspects of the prior art.

According to the invention, this object is met in that at least one of the side walls has a stabilizer receptacle for connection to a stabilizer link. The inventive tension stop limit holder has several advantages. The receptacle is generally a punched opening which may be used for a holding pin for the welding device. In contrast, the prior art tension stop limit holders sometimes have surfaces which extend at a slight inclination and which can be used as clamping surfaces only under very specific conditions.

Further, the stabilizer receptacle economically obviates the need for a separate stabilizer holder. Comparison measurements have shown that a reduction in mass of about 130 g per vibration damper may be achieved.

In addition, an exact alignment of the stabilizer with respect to the vehicle axle is achieved. In the case of extreme deflection movements of the vehicle axle—e.g., when the vehicle is lifted on a lifting platform or car lift—the tension stop limit holder limits the deflection movement, in principle, in that the tension stop limit holder contacts a stop which is in a fixed position relative to the vehicle body. This stop is in turn a component part of the non-springing part of the vehicle axle. When the tension stop limit holder is exactly aligned with the vehicle axle, the stabilizer link is positioned in one work step. The punched openings can be carried out in a very precise manner.

To minimize expenditure on different tension stop limit holders for the left and right sides of the vehicle, both side walls may include a receptacle. Therefore, one construction can be used for both installation positions of the vibration damper. In addition, a second fastening point for the welding device is achieved, making possible an extremely accurate alignment of the tension stop limit holder.

In an optional embodiment, at least one side wall has an elongation in which the receptacle is formed. The advantage of this embodiment is that a fastening screw for the stabilizer in the receptacle is accessible from the bottom and from the top because the base plate does not block access.

Depending on the axle construction, it may be necessary to arrange the stabilizer spaced to the side relative to the tension stop limit holder. For such applications, the elongation extends radially with respect to a contour of the base plate.

In order to strengthen the tension stop limit holder with respect to the introduction of force via the stabilizer, a connection piece may be provided between the radially extending elongation and the side wall.

Strength is increased in particular in that the connection piece extends between the upper edges of the side wall and the elongation. The elongation, connection piece and side wall form a half-open box which is very stable, particularly because these structural component parts are formed from one piece.

To be able to arrange the weld thickness such that it is independent from the material thickness of the tension stop limit holder, the weld connecting the tension stop limit holder with the container tube is formed at the transition of the lateral surface to the elongation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar element throughout the several views.

DETAILED DESCRIPTION OF THE PRESENTLY PREFERRED EMBODIMENTS

Figure 1:
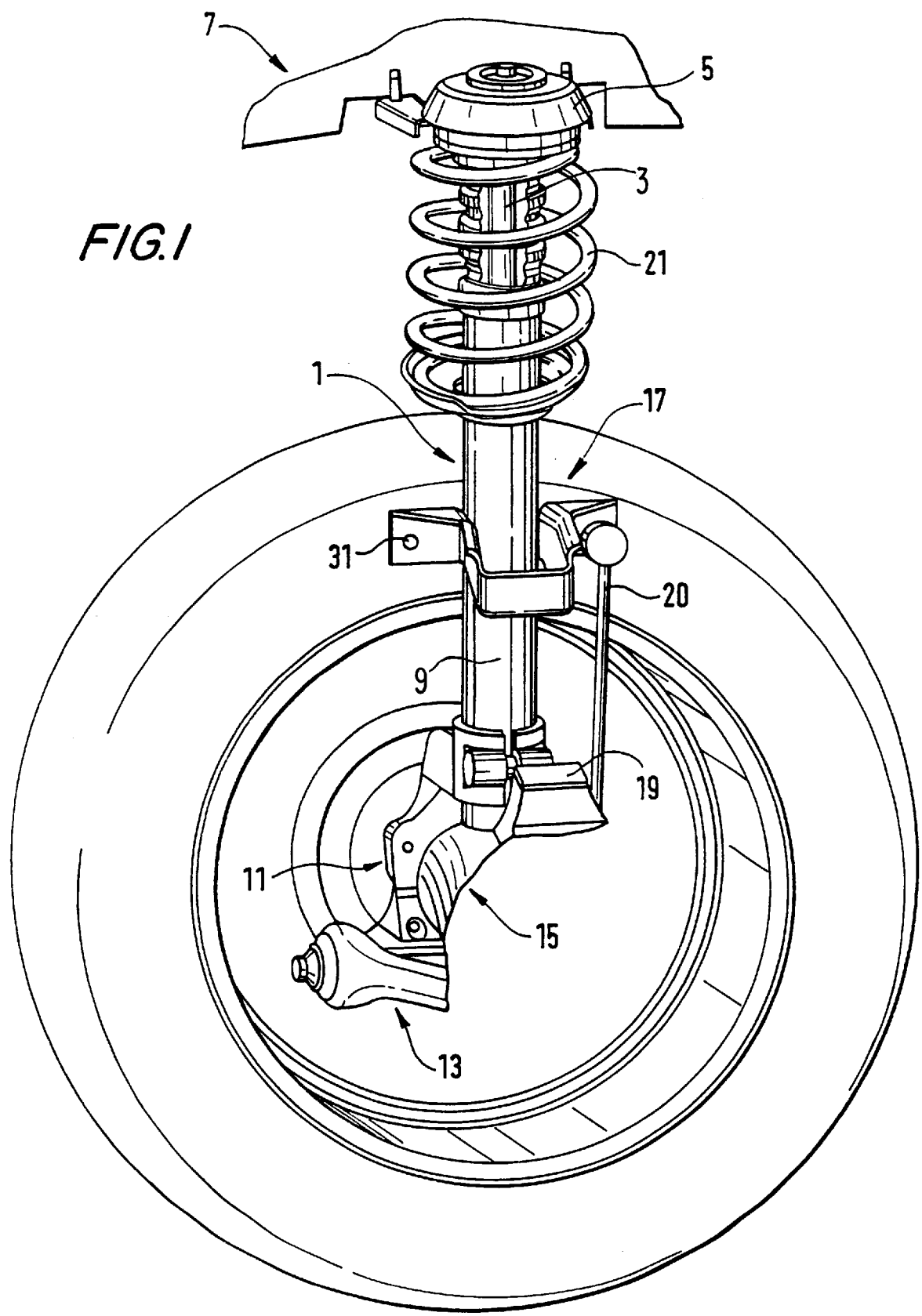
FIG. 1 shows a tension stop limit holder installed in a vehicle suspension.

Referring to FIG. 1, a tension stop limit holder 17 is shown in its installed condition in a vehicle suspension. A vibration damper 1, in this case a spring strut, is connected with a supporting bearing 5 of a vehicle body 7 via a piston rod 3. A container tube 9 of the vibration damper 1 is connected with a wheel carrier 11 which is connected in turn to a transverse link or control arm 13 as component part of a vehicle axle 15.

The container tube 9 includes the tension stop limit holder 17 which contacts a stationary supporting surface 19 which is fixed to the vehicle body 7 (the connection of the stationary supporting surface 19 to the vehicle body 7 is not shown) on the axle side of the vibration damper 1 when the maximum deflection position of the vehicle axle 15 is reached, such, for example, as when the vehicle is jacked up. In this maximum deflection position of the vehicle axle 15, large bending moments which result from the mass of the vehicle axle 15 and the additional action of springing force of a vehicle suspension spring 21 act on the connection between the container tube 9 and the tension stop limit holder 17. For this reasons the tension stop limit holder 17 includes a receptacle 31. A stabilizer 20 is connected to the tension stop limit holder 17 via the receptacle 31.

Figure 2:
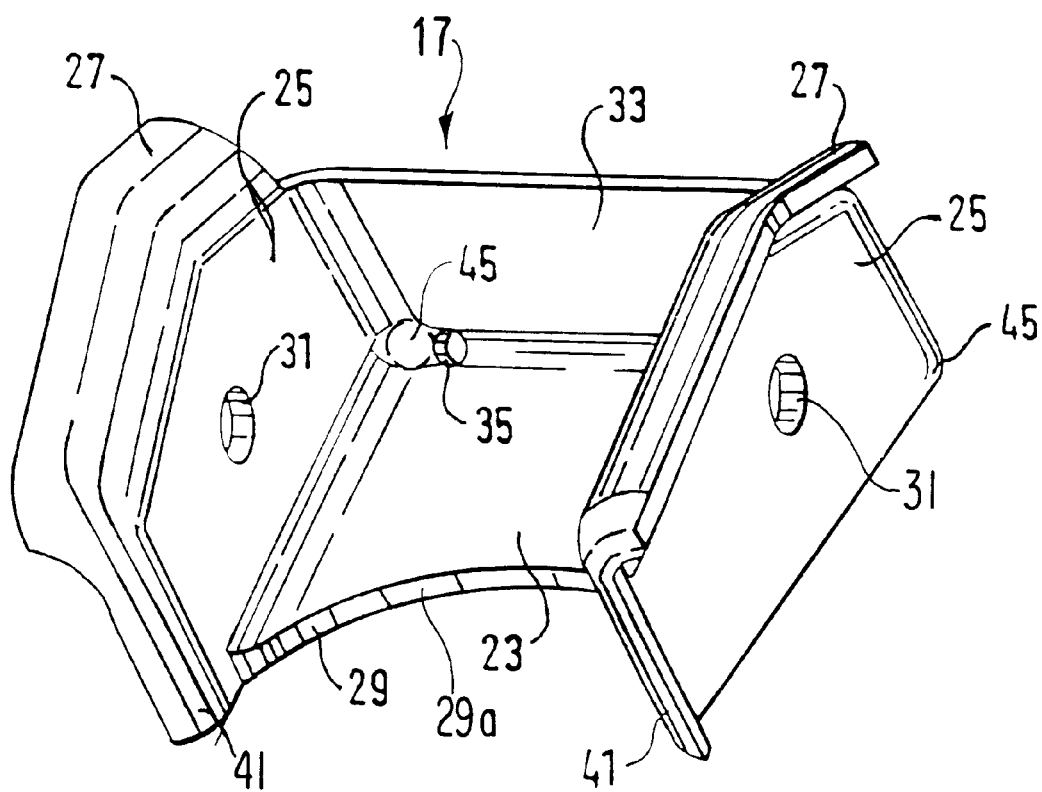
FIG. 2 is a perspective view of a first embodiment of the tension stop limit holder of FIG. 1.

FIG. 2 shows an embodiment of the tension stop limit holder 17. The tension stop limit holder comprises a base plate 23 which forms a U-section together with side walls 25. For purposes of stiffening, the ends of the side walls 25 extending parallel to a longitudinal axis are bent to form collars 27. The base plate 23 has a cutout 29 forming a front edge 29a of the base plate 23 for receiving the container tube 9 of the vibration damper 1.

The entire tension stop limit holder 17 is constructed as a flow-formed bent part. All individual surfaces such as base plate 23, side walls 25 and an intermediate wall 33 are produced from a plate and, after the shaping process, form a seamless structural component part which is free from abutting edges. Experiments show that this embodiment can be particularly highly loaded because there are neither weld seams nor positive-engagement connections at the structural component part.

The tension stop limit holder 17 has openings 35 which allow cleaning liquids and excess paint to flow out during manufacture and allow splash water to flow out of the tension stop limit holder when applied in the vehicle. To prevent convergence of the free punches introduced for the openings before shaping, these free punches are placed in such a way that the openings lie outside of the transition radius 45 between the base plate 23, side walls 25 and intermediate wall 33.

The embodiment of FIG. 2 includes the receptacle 31 for connection to a stabilizer link, preferably in both side surfaces 25. However, the receptacle 31 may be formed in only one of the side walls 25, as required. The receptacle 31 is formed by a punched opening which may be punched while the tension stop limit holder is in blank form—i.e., before the shaping. The receptacles 31 in the side walls 25 are used as positioning openings for the subsequent welding process in which the tension stop limit holder 17 is welded to the container tube 9. The receptacles 31 in the side walls 25 lie on an axis and may therefore be penetrated by a clamping screw, so that a very high positioning accuracy is achieved for welding.

Figure 3:
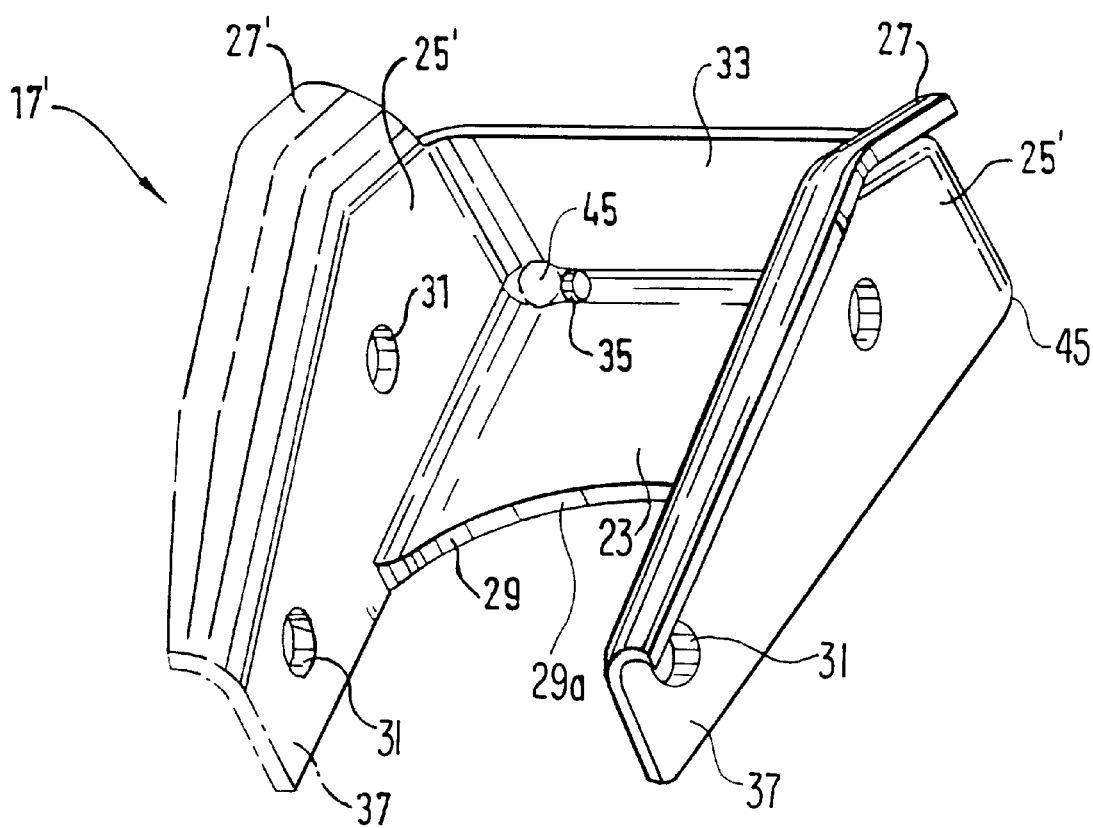
FIG. 3 is a perspective view of a second embodiment of the tension stop limit holder of FIG. 1.
Figure 5:
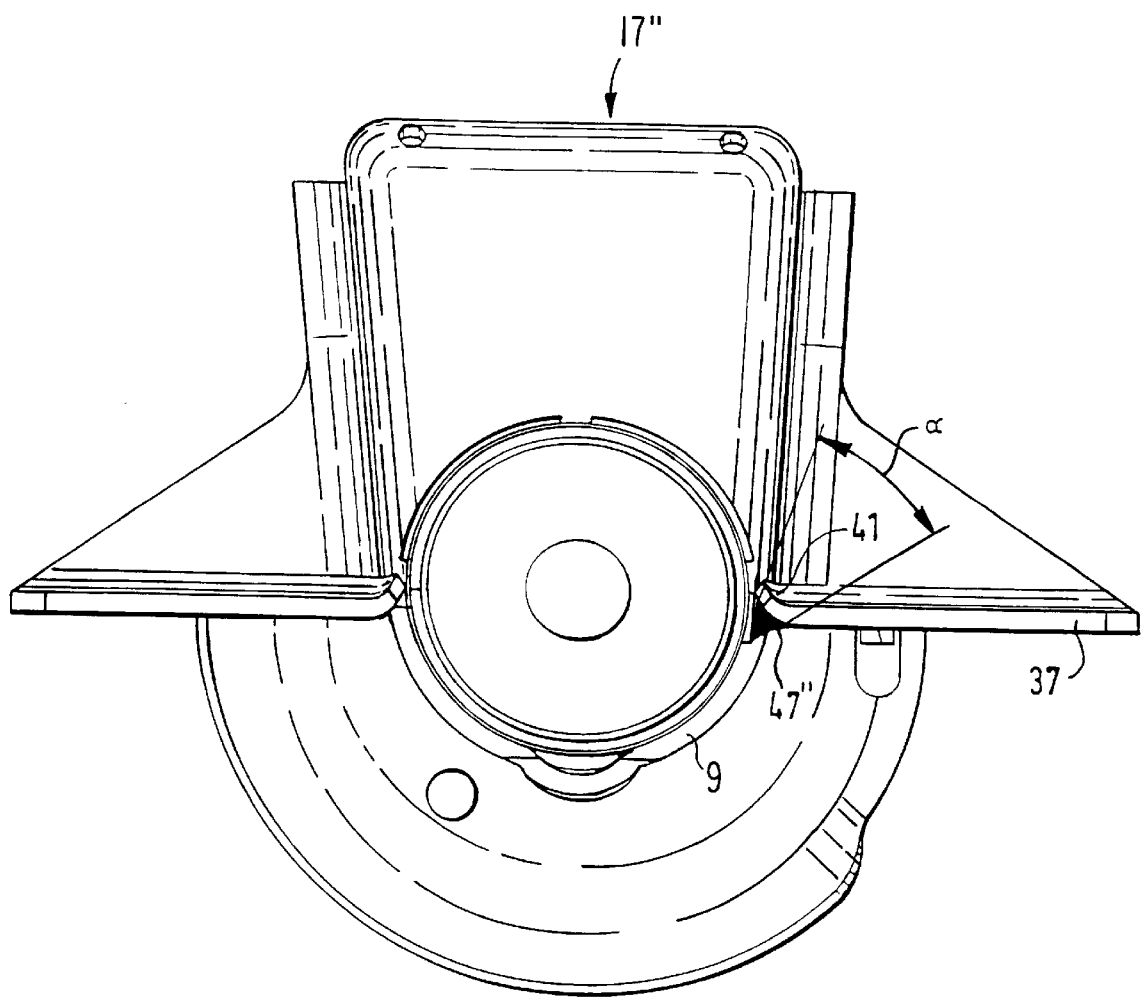
FIG. 5 is a top view of the vibration damper with the tension stop limit holder of FIG. 4.

FIG. 3 shows an alternate embodiment of a tension stop limit holder 17' in which the side walls 25' have elongations 37 which extend beyond the point of greatest width of the container tube 9, so that there is an overhang or projection 39 when the tension stop limit holder 17' is in the installed position (see FIG. 5). In this embodiment, the receptacles 31 may be positioned on the elongations 37.

Figure 4:
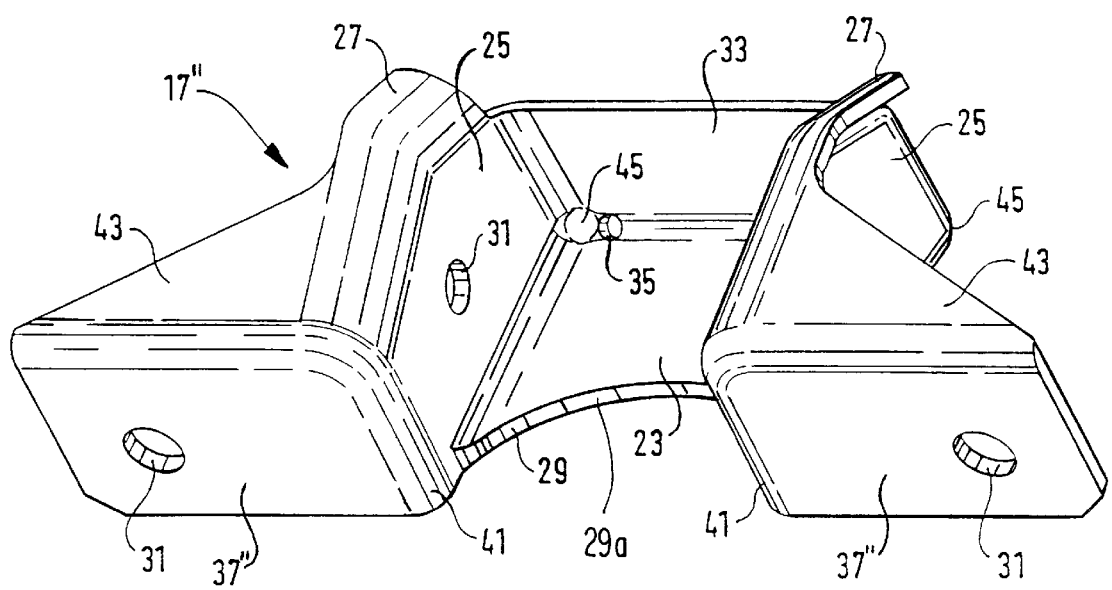
FIG. 4 is a perspective view of a third embodiment of the tension stop limit holder of FIG. 1.

In a further embodiment shown in FIG. 4, a tension stop limit holder 17" includes elongations 37" which extend radially with respect to the contour 29 of the base plate 23. The receptacles 31 are likewise formed in the elongations 37". Connection curves 41 are formed integral between the side walls 25 and elongations 37". These connection curves 41 are also present in the first embodiment shown in FIG. 2. However, in the FIG. 2 embodiment these connection curves 41 comprise end curves.

In this embodiment of FIG. 4, the elongations 37" are stiffened at the upper edge or collars 27 relative to the corresponding side wall 25 by a connection piece 43. The connection piece 43 is constructed in one piece with the other portions of the tension stop limit holder 17".

In both embodiments shown in FIGS. 3 and 4, the tension stop limit holder 17' and 17" may comprise only one of the elongations 37' and 37", respectively.

Figure 6:
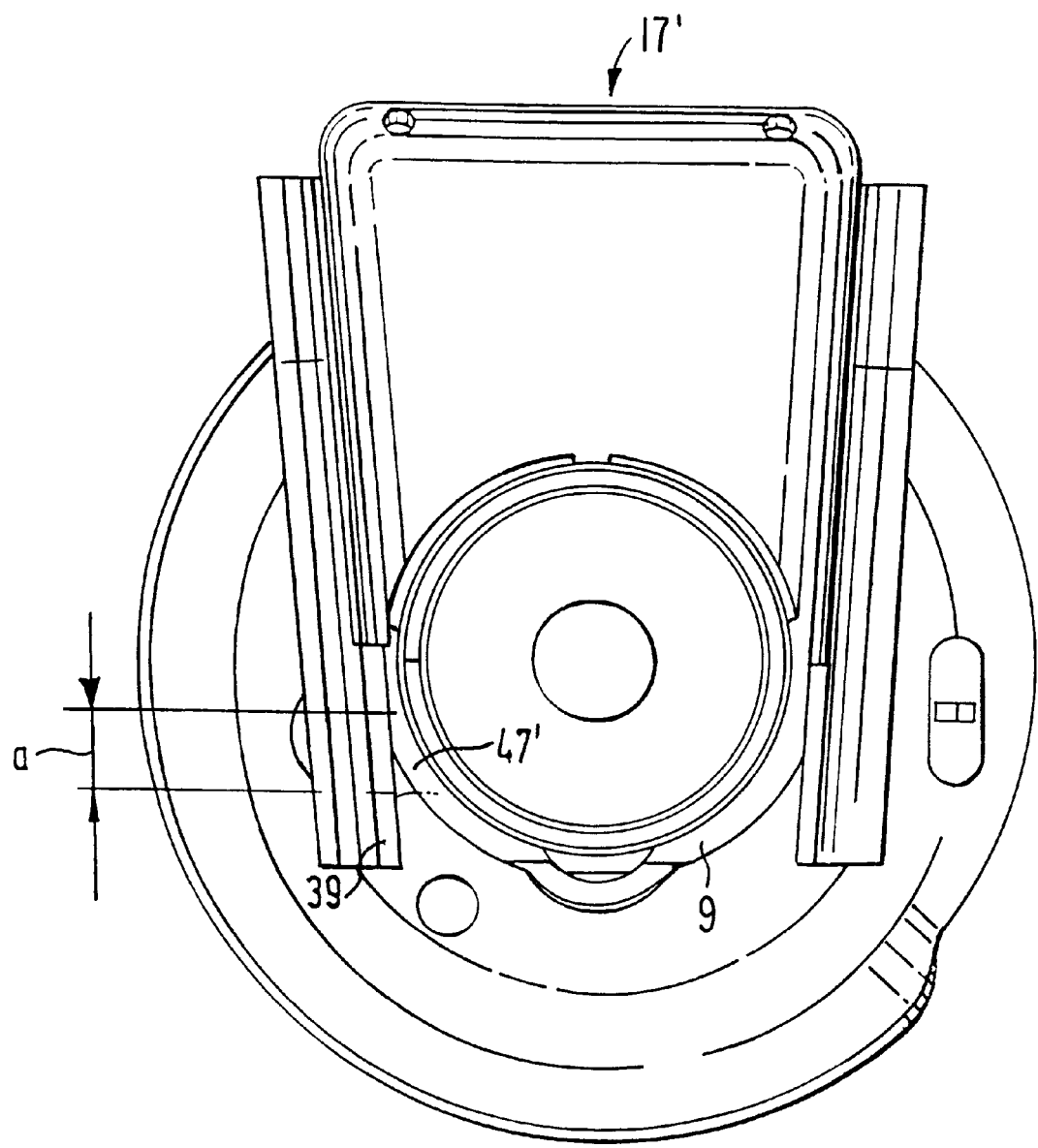
FIG. 6 is a top view of the vibration damper with the tension stop limit holder of FIG. 3.

The advantage of the embodiments of FIG. 2–4 is evidenced in the top views of the embodiments shown in FIGS. 5 and 6. The projection 39 is shown in FIG. 5 and the connection curve 41 is shown in FIG. 6. Together with the container tube 9, the projection 39 of the tension stop limit holder 17' form a groove for a weld 47' and the connection curve 41 of the tension stop limit holder 17" (and 17) forms a groove for a weld 47". The welds 47' and 47" respectively join the tension stop limit holders 17' and 17" with the container tube 9 depending on the radii of the container tube 9. In both embodiments, the weld thickness a is not dependent on the wall thickness of the tension stop limit holder 17', 17" and can be comparatively generously dimensioned. The quantity a is included linearly in the calculation of the carrying capacity of the weld 47' and 47". Although it is not shown, the weld thickness of the first embodiment of the tension stop limit holder 17 shown in FIG. 2 is the same as the weld 47" shown in FIG. 6 because the embodiment of FIG. 2 also includes the connection curve 41.

The invention is not limited by the embodiments described above which are presented as examples only but can be modified in various ways within the scope of protection defined by the appended patent claims.

I claim:

1. A tension stop limit holder for connection with a container tube of a vibration damper in a vehicle suspension having a stabilizer and stabilizer link, comprising:

a U-shaped base section having a base plate and two side walls connected on opposing sides of the lease plate wherein the base plate has a cutout forming a front edge which is adapted for receiving an outer contour of the container tube of the vibration damper so that said front edge contacts the container tube and the side walls are weldable to the container tube; and a first receptacle arranged on one of said two side walls for connection to the stabilizer link of the vehicle suspension, wherein at least said one of said two side walls comprises an elongation and said first receptacle is arranged in said elongation of said at least said one of said two side walls.

2. The tension stop limit holder of claim 1, further comprising, a second receptacle for connection to the stabilizer link arranged on the other one of said side walls.

3. The tension stop limit holder of claim 1, wherein said elongation extends radially with respect to said cutout of said base plate.

4. The tension stop limit holder of claim 3, further comprising a connection piece arranged between said elongation and said at least one of said side walls for increasing a strength of said tension stop limit holder.

5. The tension stop limit holder of claim 4, wherein said connection piece extends between an upper edge of said at least said one side wall and said elongation.

6. The tension stop limit holder of claim 1, further comprising a transition area between said elongation and said at least said one of said two side walls operatively arranged for receiving a weld for connecting said at least said one of said two side walls with the container tube of said vibration damper.

* * * * *